(12) United States Patent
Amrit et al.

(10) Patent No.: US 10,850,774 B2
(45) Date of Patent: Dec. 1, 2020

(54) SIDE RAIL ASSEMBLY FOR A VEHICLE

(71) Applicant: Dura Operating, LLC, Auburn Hills, MI (US)

(72) Inventors: Anand Amrit, Auburn Hills, MI (US); Nolan Robert Maryanski, Rochester, MI (US); Suhant Ranga, Novi, MI (US)

(*) Notice: Subject to any disclaimer, the term of this patent is extended or adjusted under 35 U.S.C. 154(b) by 32 days.

(21) Appl. No.: 16/189,217

(22) Filed: Nov. 13, 2018

(65) Prior Publication Data

US 2020/0148269 A1 May 14, 2020

(51) Int. Cl.
| | |
|---|---|
| *B62D 21/15* | (2006.01) |
| *B62D 25/02* | (2006.01) |
| *B62D 25/20* | (2006.01) |
| *B60K 1/04* | (2019.01) |
| *B60R 19/26* | (2006.01) |

(52) U.S. Cl.
CPC ............ *B62D 21/155* (2013.01); *B60R 19/26* (2013.01); *B62D 25/025* (2013.01); *B62D 25/2009* (2013.01); *B60K 2001/0438* (2013.01); *B60R 2019/264* (2013.01)

(58) Field of Classification Search
CPC .. B62D 21/02; B62D 21/157; B62D 25/2009; B62D 25/2036; B62D 25/025; B60K 2001/438; B60K 2001/0438
USPC ........................ 296/203.01–203.04, 204–209
See application file for complete search history.

(56) References Cited

U.S. PATENT DOCUMENTS

| | | | |
|---|---|---|---|
| 6,139,094 A * | 10/2000 | Teply ................... | B62D 23/005 296/203.03 |
| 9,738,324 B1 * | 8/2017 | Vigil ..................... | B62D 25/04 |
| 2012/0161475 A1 * | 6/2012 | Mori .................... | B62D 21/152 296/193.06 |
| 2013/0088045 A1 * | 4/2013 | Charbonneau ....... | B62D 21/157 296/187.12 |
| 2016/0114667 A1 * | 4/2016 | Ikeda ..................... | B60K 1/04 180/68.5 |
| 2017/0149023 A1 | 5/2017 | Baik et al. | |
| 2017/0305250 A1 * | 10/2017 | Hara ..................... | B60K 1/04 |
| 2017/0305251 A1 * | 10/2017 | Hara ..................... | B62D 25/20 |
| 2018/0050736 A1 * | 2/2018 | Teshima ................ | B60R 19/02 |
| 2018/0186227 A1 * | 7/2018 | Stephens ............. | H01M 2/1083 |
| 2018/0237075 A1 * | 8/2018 | Kawabe ............... | B62D 21/157 |
| 2019/0047628 A1 * | 2/2019 | Kawase ............... | B62D 21/157 |
| 2019/0100090 A1 * | 4/2019 | Matecki ................ | B60K 1/04 |
| 2019/0248423 A1 * | 8/2019 | Kato ..................... | B62D 25/20 |
| 2019/0255930 A1 * | 8/2019 | Steiner ................. | B60K 1/04 |
| 2019/0256151 A1 * | 8/2019 | Page ..................... | B60K 1/04 |
| 2019/0256152 A1 * | 8/2019 | Ranga .................. | B60K 6/28 |
| 2019/0359048 A1 * | 11/2019 | Tsuyuzaki ............ | B60K 1/04 |
| 2019/0359260 A1 * | 11/2019 | Tsuyuzaki .......... | B62D 25/2036 |
| 2020/0023905 A1 * | 1/2020 | Kawase ............... | B60L 50/64 |

* cited by examiner

*Primary Examiner* — Gregory A Blankenship
(74) *Attorney, Agent, or Firm* — Vivacqua Crane PLLC

(57) ABSTRACT

A side rail assembly connected to a battery tray in a motor vehicle includes a side impact rail having a first portion with a first strength, a second portion with a second strength, the second portion spaced apart from the first portion, and a third portion with a third strength, the third portion connected to the first portion and the second portion. The third strength is greater than the first strength and is greater than the second strength.

23 Claims, 3 Drawing Sheets

SIDE RAIL ASSEMBLY FOR A VEHICLE

FIELD

The present disclosure relates generally to a battery tray assembly in a battery powered vehicle, and more particularly to an energy absorbing side rail assembly used with the battery tray assembly.

BACKGROUND

The statements in this section merely provide background information related to the present disclosure and may or may not constitute prior art.

Motor vehicles, including electric and hybrid vehicles providing at least partial propulsion from battery power, create unique conditions that must be considered due to the energy and fluid in the battery cells. For example, battery tray assemblies, which house the battery cells, include energy absorbing structures used to absorb structural impact in order to minimize battery cell damage. The battery trays of known battery powered and hybrid or battery-engine powered vehicles, hereinafter collectively referred to as "battery powered" vehicles, provide features to absorb impact loads from below and from the sides of the battery trays to minimize damage to the battery cells inside. However, the structural designs of such battery trays often require total replacement of the battery tray following minor structural damage and add significant cost to the battery tray to accommodate impact loading.

Thus, while current battery powered vehicle tray designs achieve their intended purpose, there is a need for a new and improved system and method to absorb battery tray energy loading while reducing mass.

SUMMARY

According to several aspects, a side rail assembly connected to a battery tray in a motor vehicle is provided. The side rail assembly includes a side impact rail having a first portion with a first strength, a second portion with a second strength, the second portion spaced apart from the first portion, and a third portion with a third strength, the third portion connected to the first portion and the second portion. The third strength is greater than the first strength and is greater than the second strength.

In one aspect, the third portion includes a first section, a second section, and a third section, each having the third strength, and the first section is disposed opposite and spaced apart from the second section.

In another aspect, the third section is substantially perpendicular to the first section and the second section.

In another aspect, the first section is connected to the first portion and the second section is connected to the second portion.

In another aspect, the first and second portions are connected to a side wall of a battery tray.

In another aspect, the first portion has a first thickness, the second portion has a second thickness, and the third portion has a third thickness, and the third thickness is greater than the first thickness and is greater than the second thickness.

In another aspect, the first thickness is equal to the second thickness.

In another aspect, the third thickness is about 25% to about 30% thicker than the first thickness and the second thickness.

In another aspect, the first thickness is about 1.2 mm, the second thickness is about 1.2 mm, and the third thickness is about 1.5 mm.

In another aspect, the first portion is made from a first type of material, the second portion is made from a second type of material, and the third portion is made from a third type of material, wherein the third type of material is different than the first type of material and different from the second type of material.

In another aspect, the first type of material is the same as the second type of material.

In another aspect, the first portion, the second portion, and the third portion have the same thickness.

In another aspect, the first portion is welded to the third portion and the second portion is welded to the third portion prior to being formed.

In another aspect, a first member is connected to the battery tray, wherein the first portion of the side impact rail is connected to the first member.

In another aspect, a second member is connected to the battery tray, wherein the second portion of the side impact rail is connected to a top surface of the member.

In another aspect, a ground impact side rail is connected to a bottom surface of the second member.

In another aspect, the third portion is connected to a portion of the vehicle.

According to several other aspects, a side rail assembly connected to a battery tray in a motor vehicle is provided. The side rail assembly includes a roll formed side impact rail configured to exhibit the properties of a roll formed tailor welded material, the roll formed side impact rail having: a first portion with a first strength, a second portion with a second strength, the second portion disposed substantially parallel and opposite to the first portion, and a third portion with a third strength, the third portion having a first section, a second section, and a third section connected to the first section and the second section, each section having the third strength. The first section is disposed opposite and substantially parallel to the second section and the third section is disposed substantially perpendicular to the first section and the second section, and the first section is welded to the first portion and the second section is welded to the second portion. The third strength is greater than the first strength and is greater than the second strength.

In one aspect, the first portion has a first thickness, the second portion has a second thickness, and the third portion has a third thickness, and the third thickness is greater than the first thickness and is greater than the second thickness.

In another aspect, a first portion outer surface of the first portion and a first section outer surface of the first section are co-planar and a second portion outer surface of the second portion and a second section outer surface of the second section are co-planar.

In another aspect, a plurality of attachment holes are disposed through the first section and the third section of the third portion for connecting the roll formed side impact rail to the vehicle.

According to several other aspects, a battery tray assembly for a vehicle is provided. The battery tray assembly includes a battery tray having a side wall and a side rail assembly. The side rail assembly includes a first member connected to the side wall, a second member connected to the side wall, a ground impact rail connected to the second member, and a side rail. The side rail includes a first portion with a first strength, the first portion connected to the first member, a second portion with a second strength, the second portion connected to the second member, and a third portion with a third strength, wherein the third strength is greater than the first strength and the second strength, wherein the third portion is connected to the first portion and to the second portion.

In one aspect, the side rail assembly extends along an entire length of the side wall of the battery tray.

In another aspect, the first member and the second member are roll formed and each include a square portion and a rectangular portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
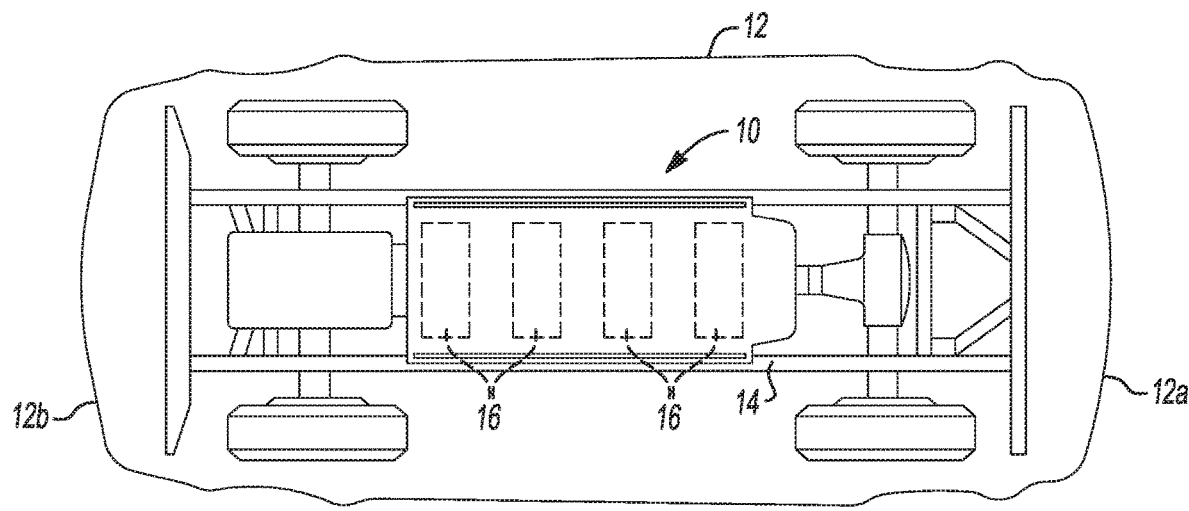
FIG. 1 is a bottom plan view of battery powered vehicle having a battery tray assembly according to an exemplary embodiment.

Referring to FIG. 1, a battery tray assembly is generally indicated by reference number 10. The battery tray assembly 10 is shown with an exemplary battery powered vehicle 12. While the battery powered vehicle 12 is illustrated as a passenger car, it should be appreciated that the battery powered vehicle 12 may be a truck, SUV, bus, or any other type of vehicle. The battery tray assembly 10 is mounted to a frame 14 of the battery powered vehicle 12. The battery tray assembly 10 is configured to house at least one and according to several aspects multiple individual battery cells 16 which provide an electrical charge as the sole power to propel the vehicle 12, or may provide supplemental power in addition to an engine (not shown).

Figure 2:
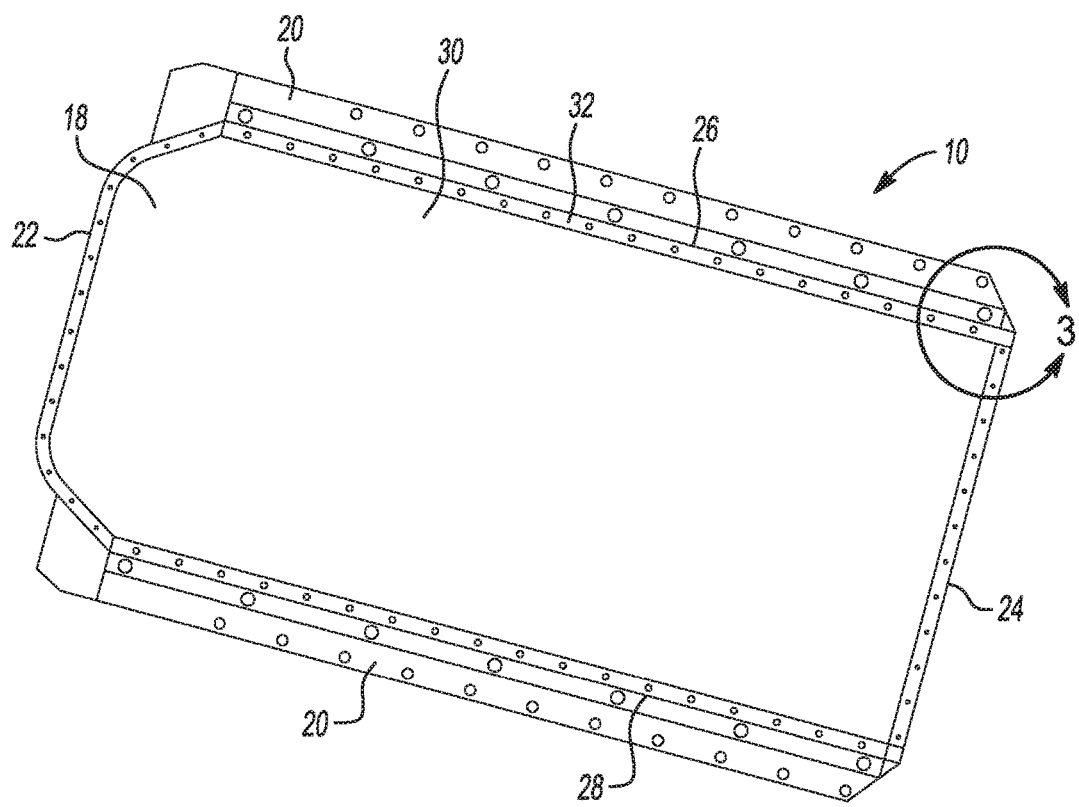
FIG. 2 is a top plan view of the battery tray assembly of FIG. 1.

Referring to FIG. 2, the battery tray assembly 10 generally includes a tub 18 and a pair of side rail assemblies 20. The tub 18 is preferably formed as a monolithic unitary structure, such as by stamping or drawing from a metal sheet to form the entire tub 18. In one aspect, the tub 18 is roll-formed from a tailor welded blank. The tub 18 includes a front wall 22, a rear wall 24, a first side wall 26, and a second side wall 28 all connected to a base 30. The front wall 22 is disposed opposite the rear wall 24 while the first side wall 26 is disposed opposite the second side wall 28. In some embodiments, the tub 18 does not include the front wall 22 and the rear wall 24. As shown in FIG. 1, the front wall 22 is oriented towards a front 12A of the vehicle 12 while the rear wall 24 is oriented towards a rear 12B of the vehicle 12. The first side wall 26 connects the front wall 22 and the rear wall 24 and the second side wall 28 connects the front wall 22 and the rear wall 24. The tub 18 is configured to hold the battery cells 16. The tub 18 includes an upper flange 32 that extends outwardly from an upper end of the tub 18. A cover (not shown) is connected to the upper flange 22.

The side rail assemblies 20 are connected to the first side wall 26 and the second side wall 28. The side rail assemblies 20 extend along an entire length of the side walls 26, 28 to provide an energy absorbing side impact structure for the battery tray assembly 10. The side rail assemblies 20 are substantially identical and therefore only one side rail assembly 20 will be described herein.

Figure 3:
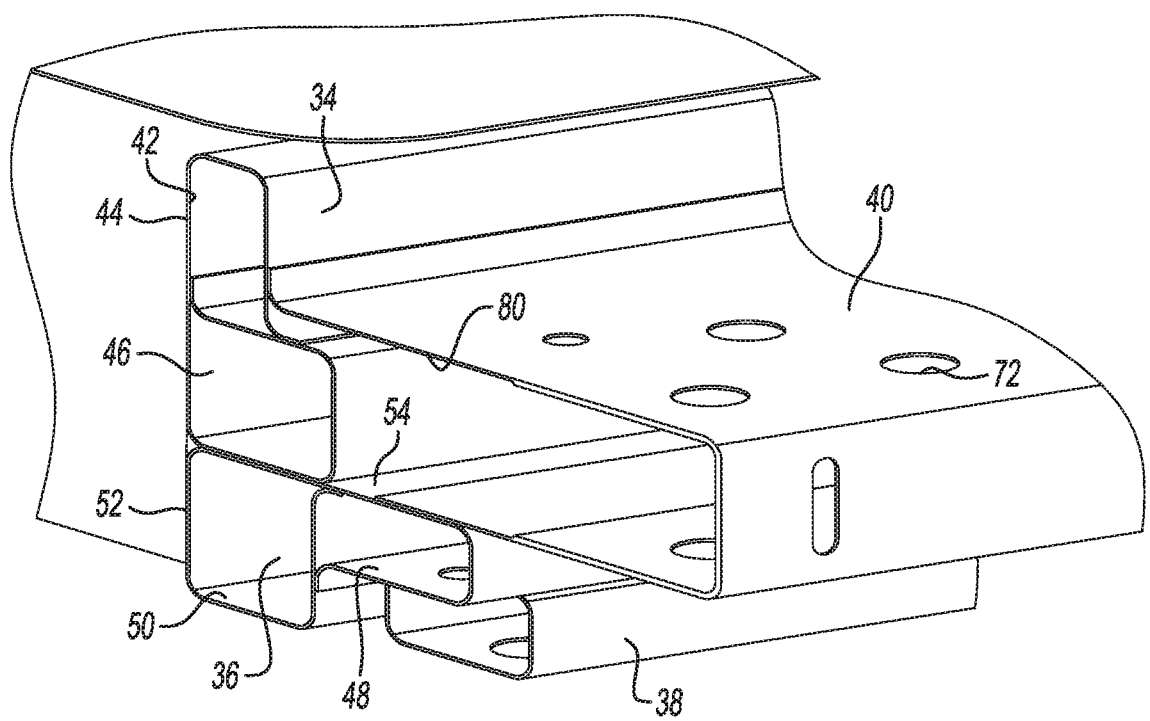
FIG. 3 is an end perspective view of a side rail assembly shown in area 3 of FIG. 2.
Figure 4:
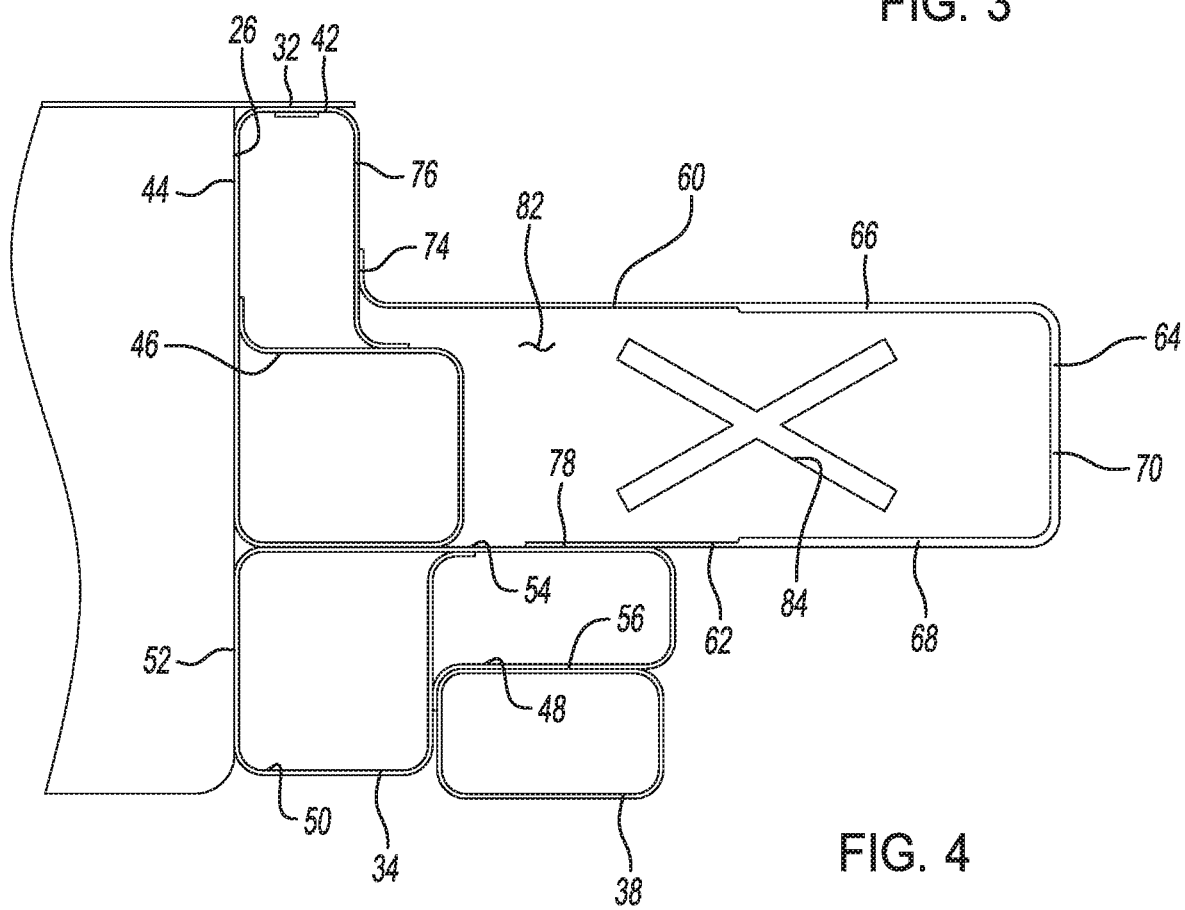
FIG. 4 is an end view of the side rail assembly shown in area 3 of FIG. 2.

Turning now to FIGS. 3 and 4, the side rail assembly 20 includes a first member 34, a second member 36, a ground impact side rail 38, and a side impact rail 40. The first member 34 is formed of a single plate of metal such as steel which is formed to define a generally rectangular shaped first tube 42 and a generally square shaped second tube 44. Alternatively, either or both the first tube 42 and the second tube 44 may be generally square shaped or generally rectangular shaped allowing the first member 34 to be tuned or designed to absorb different amounts of loading force at different locations. In one embodiment, the first member 34 is roll-formed. The first member 34 is connected to the first side wall 26. The first member 34 is oriented such that a flat long side 46 of the first tube 42 and the second tube 44 abut the first side wall 26.

The second member 36 is also formed of a single plate of metal such as steel which is formed to define a generally rectangular shaped first tube 48 and a generally square shaped second tube 50. Alternatively, either or both the first tube 48 and the second tube 50 may be generally square shaped or generally rectangular shaped allowing the second member 36 to be tuned or designed to absorb different amounts of loading force at different locations. In one embodiment, the second member 36 is roll-formed. The second member 36 is connected to the first side wall 26. The second member 36 is oriented such that a flat short side 52 of the second tube 50 abuts the first side wall 26 while a flat long side 54 of the first tube 48 and the second tube 50 abuts the first member 34. Thus, the second member 36 is oriented ninety degrees relative to the first member 34.

The ground impact side rail 38 generally forms a lowest face of the battery tray assembly 10 with respect to a ground level, and therefore provides an impact face of first contact should the vehicle 12 traverse a ground feature that is contacted by the battery tray assembly 10. The ground impact side rail 38 is a hollow tube and is connected to a bottom side 56 of the first tube 48 of the second member 36. The ground impact side rail 38 can be made for example from one or more materials such as rolled metal plate including steel or aluminum, a combination of materials such as a metal and a polymeric material, a composite material and material alloys.

Figure 5:
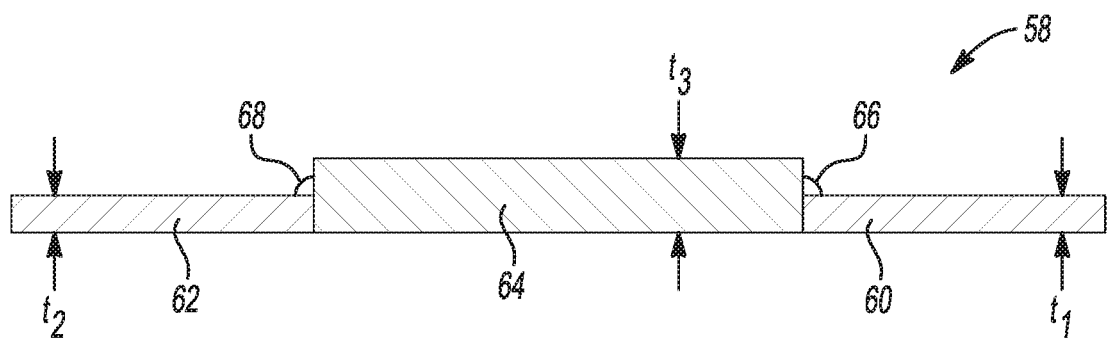
FIG. 5 is a cross-section view of a tailor welded blank used in forming the side rail assembly.

The side impact rail 40 is an energy absorbing structure configured to crumple during a side impact and prevent penetration of the tub 18. The side impact rail 40 is formed from a tailor welded blank. In one embodiment, the side impact rail 40 is roll-formed from the tailor welded blank. In another aspect, the side impact rail 40 is formed by bending or drawing the tailor welded blank. The tailor welded blank, shown in FIG. 5 prior to forming and indicated by reference number 58, generally includes a first portion 60, a second portion 62, and a third portion 64. The first portion 60 is welded to the third portion 64 by welds 66. The second portion 62 is welded to the third portion 64 by welds 68. The first portion 60 is characterized as having a first strength, the second portion 62 is characterized as having a second strength, and the third portion 64 is characterized as having a third strength. The third strength is greater than the first strength and greater than the second strength. In one aspect, the first strength and the second strength are substantially equal. The strength of the portions 60, 62, 64 is customized by modifying a thickness of the portions 60, 62, 64, as shown in FIG. 5, and/or by selecting different materials for the portions 60, 62, 64. For example, in one embodiment shown in FIG. 5, the portions 60, 62, 64 are comprised of the same material but the third portion 64 has a cross-section thickness "t3" that is greater than a cross-section thickness "t1" of the first portion and a cross-section thickness "t2" of the second portion. Increasing the thickness t3 increases axial, shear, torsional and bending strength of the third portion 64. In one aspect of the present disclosure, the first thickness t1 is equal to the second thickness t2. In another aspect, the third thickness t3 is about 25% to about 30% thicker than the first thickness t1 and the second thickness t2. The term "about" as used herein is known to those skilled in the art. Alternatively, the term "about" means+/−5%. In another aspect, the first thickness t1 is about 1.2 mm, the second thickness t2 is about 1.2 mm, and the third thickness t3 is about 1.5 mm. The term "about" as used herein is known to those skilled in the art. Alternatively, the term "about" means+/−0.3 mm.

Figure 6:
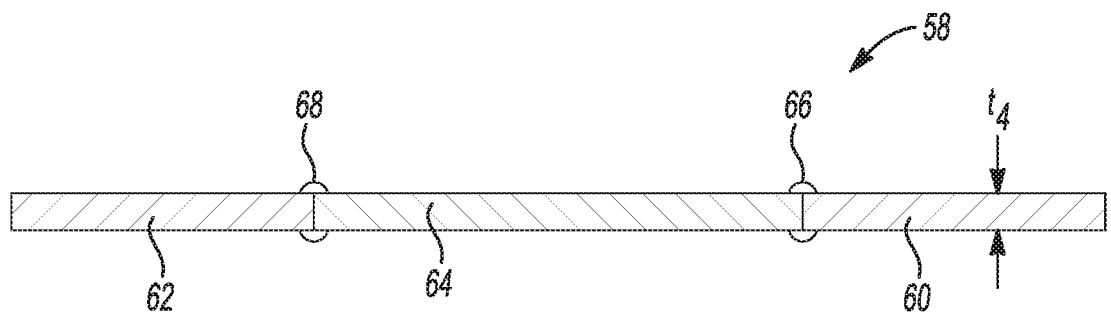
FIG. 6 a cross-section view of another example of a tailor welded blank used in forming the side rail assembly.

In an alternate embodiment shown in FIG. 6, the portions 60, 62, 64 have the same thickness "t4" but are made of different materials. For example, the third portion 64 is comprised of Grade 70 steel while the first portion 60 and the second portion 62 are comprised of Grade 50 steel. Changing the material grade of the steel modifies the yield and ultimate stress or stiffness of the portions 60, 62, 64 and thus their strength. In other examples, the portions 60, 62, 64 are comprised of multiple grades of aluminum, such as 5000 series and 6000 series, friction-stir welded together or a steel aluminum combination, such as 6000 series welded to EDDS steel, so long as the third portion 64 has a greater strength.

Returning to FIGS. 3 and 4, the tailor welded blank 58 is formed such that the first portion 60 is disposed spaced apart from the second portion 64 to form a closed section that improves bending strength of the side impact rail 40. For example, the first portion 60 is disposed substantially opposite and parallel to the second portion 62. The term "substantially" as used herein is known to those skilled in the art. Alternatively, the term "substantially" means+/−10 degrees. The third portion 64 includes a first section 66, a second section 68, and a third section 70. The first section 66 is connected to the first portion 60. The second section is connected to the second portion 62. The third section 70 is disposed between the first section 66 and the second section 68 and is substantially perpendicular to the first portion 60 and the first section 66 and substantially perpendicular to the second portion 64 and the second section 68. The term "substantially" as used herein is known to those skilled in the art. Alternatively, the term "substantially" means+/−10 degrees. Thus, the side impact rail 40 has a U-shaped cross section. To provide a continuous outer surface for attachment, the tailor welded blank 58 is formed such that increased thicknesses are disposed within the closed section. Accordingly, a first portion outer surface 71 of the first portion 60 and a first section outer surface 73 of the first section 66 are co-planar. Likewise, a second portion outer surface 75 of the second portion 62 and a second section outer surface 77 of the second section 68 are co-planar.

The side impact rail 40 may include multiple apertures 72 which individually receive one of multiple fasteners (not shown) to releasably fix the battery tray assembly 10 to the frame 14 of the vehicle 12. In the example provided the apertures 72 are disposed through the third portion 64. The side impact rail 40 is connected to the first member 34 and the second member 36. The first portion 60 includes a flange 74 welded or otherwise connected to an outer short side 76 of the first tube 44 of the first member 32. A distal end 78 of the second portion 62 is welded or otherwise connected to the long side 54 of the second member 34.

The side impact rail 40 defines a longitudinal cavity or closed section 80 between the first portion 60, the second portion 62, and the third portion 64. Multiple baffles or stiffening plates 82 are positioned within the cavity 80, with a quantity of the stiffening plates 82 predetermined by the anticipated impact loading expected to be received by the side impact rail 40. The stiffening plates 82 and the side impact rail 40 will crush or deflect to absorb an impact load directed toward the side wall 26 of the tub 18 to help prevent damage to the side wall 26 and therefore to the battery cells 16 located within the tub 18. To further enhance a deflection resistance of the stiffening plates 82, each of the stiffening plates 82 may also include a stamped or preformed raised feature 84, having any desirable shape.

The first member 34, the second member 36, the ground impact member 38, and the side impact member 40 are fixed together for example by welding, for example by MIG or laser welding, and collectively form the side rail assembly 20 to absorb side impacts. Each of the first member 34, the second member 36, the ground impact member 38, and the side impact member 40 extend substantially an entire length of the side wall 26 of the tub 18.

The battery tray assembly having the side rail assemblies of the present disclosure offers several advantages. These include the incorporation of energy absorbing structures in an efficient space envelope. In addition, these energy absorbing structures are formed from tailor welded blanks that reduce mass while maximizing side impact energy absorption to protect the battery cells within the battery tray assembly.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A side rail assembly connected to a battery tray in a motor vehicle, the side rail assembly comprising:
    a side impact rail having:
        a first portion with a first strength;
        a second portion with a second strength, the second portion spaced apart from the first portion; and
        a third portion with a third strength, the third portion connected to the first portion and the second portion, wherein the third strength is greater than the first strength and is greater than the second strength, and wherein the first portion is made from a first type of material, the second portion is made from a second type of material, and the third portion is made from a third type of material, wherein the third type of material is different than the first type of material and different from the second type of material.

2. The side rail assembly of claim 1, wherein the third portion includes a first section, a second section, and a third section, each having the third strength, and the first section is disposed opposite and spaced apart from the second section.

3. The side rail assembly of claim 2, wherein the third section is substantially perpendicular to the first section and the second section.

4. The side rail assembly of claim 2, wherein the first section is connected to the first portion and the second section is connected to the second portion.

5. The side rail assembly of claim 1, wherein the first and second portions are connected to a portion of a battery tray.

6. The side rail assembly of claim 1, wherein the first portion has a first thickness, the second portion has a second thickness, and the third portion has a third thickness, and the third thickness is greater than the first thickness and is greater than the second thickness.

7. The side rail assembly of claim 6, wherein the first thickness is equal to the second thickness.

8. The side rail assembly of claim 7, wherein the third thickness is about 25% to about 30% thicker than the first thickness and the second thickness.

9. The side rail assembly of claim 7, wherein the first thickness is about 1.2 mm, the second thickness is about 1.2 mm, and the third thickness is about 1.5 mm.

10. The side rail assembly of claim 1, wherein the first type of material is the same as the second type of material.

11. The side rail assembly of claim 1, wherein the first portion, the second portion, and the third portion have the same thickness.

12. The side rail assembly of claim 1, wherein the first portion is welded to the third portion and the second portion is welded to the third portion prior to being formed.

13. The side rail assembly of claim 1, further comprising a first member connected to the battery tray, wherein the first portion of the side impact rail is connected to the first member.

14. The side rail assembly of claim 13, further comprising a second member connected to the battery tray, wherein the second portion of the side impact rail is connected to a top surface of the second member.

15. The side rail assembly of claim 14, further comprising a ground impact side rail, wherein the ground impact side rail is connected to a bottom surface of the second member.

16. The side rail assembly of claim 1, wherein the third portion is connected to a portion of the vehicle.

17. A side rail assembly connected to a battery tray in a motor vehicle, the side rail assembly comprising:
a roll formed side impact rail configured to exhibit the properties of a roll formed tailor welded material, the roll formed side impact rail having:
a first portion with a first strength;
a second portion with a second strength, the second portion disposed substantially parallel and opposite to the first portion; and
a third portion with a third strength, the third portion having a first section, a second section, and a third section connected to the first section and the second section, each section having the third strength, wherein the first section is disposed opposite and substantially parallel to the second section and the third section is disposed substantially perpendicular to the first section and the second section, and wherein the first section is welded to the first portion and the second section is welded to the second portion, and
wherein the third strength is greater than the first strength and is greater than the second strength.

18. The side rail assembly of claim 17, wherein the first portion has a first thickness, the second portion has a second thickness, and the third portion has a third thickness, and the third thickness is greater than the first thickness and is greater than the second thickness.

19. The side rail assembly of claim 18, wherein a first portion outer surface of the first portion and a first section outer surface of the first section are co-planar and a second portion outer surface of the second portion and a second section outer surface of the second section are co-planar.

20. The side rail assembly of claim 17, further comprising a plurality of attachment holes disposed through the first section and the third section of the third portion for connecting the roll formed side impact rail to the vehicle.

21. A battery tray assembly for a vehicle, the battery tray assembly comprising:
a battery tray having a side wall; and
a side rail assembly having:
a first member connected to the side wall;
a second member connected to the side wall;
a ground impact rail connected to the second member; and
a side rail, the side rail having:
a first portion with a first strength, the first portion connected to the first member;
a second portion with a second strength, the second portion connected to the second member; and
a third portion with a third strength, wherein the third strength is greater than the first strength and the second strength, wherein the third portion is connected to the first portion and to the second portion.

22. The battery tray of claim 21, wherein the side rail assembly extends along an entire length of the side wall of the battery tray.

23. The battery tray of claim 21, wherein the first member and the second member are roll formed and each include a square portion and a rectangular portion.

* * * * *